UNITED STATES PATENT OFFICE.

GEORG HOLSTE, OF VOHWINKEL, NEAR ELBERFELD, GERMANY, ASSIGNOR TO FAR-
BENFABRIKEN VORM. FRIEDR. BAYER & CO., OF ELBERFELD, GERMANY, A COR-
PORATION OF GERMANY.

DYE.

1,059,670.  Specification of Letters Patent.  Patented Apr. 22, 1913.

No Drawing.  Application filed February 21, 1912.  Serial No. 678,986.

*To all whom it may concern:*

Be it known that I, GEORG HOLSTE, doctor of philosophy, chemist, citizen of the German Empire, residing at Vohwinkel, near Elberfeld, Germany, have invented new and useful Improvements in New Dye, of which the following is a specification.

I have found that new and valuable products can be obtained by condensing nitrobenzoyl chlorids, such as

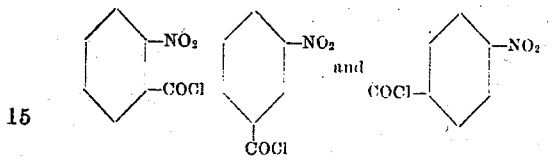

with aminobenzoylamino acids and reducing the products thus obtained.

The new products are distinguished by the remarkable property, that they have the same affinity for the fiber as the so-called substantive dyes and that they can be fixed on the fiber in the same way as these colors. Cotton thus prepared can be diazotized on the fiber and combined with suitable azo dyestuff components.

The new products are after being dried and pulverized in the shape of their alkaline salts grayish powders soluble in water, being split up by hot caustic soda lye into the amino acids and aminobenzoic acid.

In order to illustrate the new process more fully the following example is given, the parts being by weight:—52 parts of diaminostilbene-disulfonic acid (sodium salt) are stirred up with 500 parts of hot water and 20 parts of sodium carbonate. Subsequently 50 parts of molten para-nitrobenzoyl chlorid are slowly added during stirring. When the reaction is complete 200 parts of iron filings and 100 parts of acetic acid are added to the mixture of the reaction. It is rendered alkaline with soda and filtered. From the filtrate the sodium salt of the compound is precipitated by the addition of common salt. The product thus obtained is then stirred up with 10 parts of hot water and to the resulting mixture 50 parts of finely powdered or molten para-nitrobenzoyl chlorid are added in the course of half an hour while the mixture is well stirred. When the reaction is complete the nitro compound is reduced in the same way as above described. The mixture is rendered alkaline and filtered. From the resulting solution the new compound is salted out and filtered off. The product thus obtained goes on the fiber without coloring the same, but on diazotization on the fiber and on combination with suitable azo dyestuff components, valuable fast shades are produced. Beta-naphthol used as such a component or developer furnishes a fast red, 1-phenyl-3-methyl-5-pyrazolone a greenish-yellow fast to light, washing and cross-dyeing.

Other aminobenzoylamino acids can be used *e. g.* aminobenzoylamino derivatives of diaminodiphenylurea-disulfonic acid, sulfonic acids of benzidin, tolidin, dianisidin, benzidin-sulfon, aminoazobenzene, toluylenediamin, phenylenediamin, acetyl-para-phenylenediamin or 1.4.6-acetyl-naphthylenediamin, etc.

I claim:—

1. The new dyestuffs being chemically aminobenzoyl-aminobenzoyl compounds of amino acids which have no affinity for the fiber, which are after being dried and pulverized in the shape of their alkaline salts grayish powders soluble in water; possessing affinity for the fiber, and which can be diazotized on the fiber and combined with azo dyestuff components, valuable fast shades being thus obtained, substantially as described.

2. The new dyestuffs being chemically aminobenzoylaminobenzoyl compounds of amino acids which have no affinity for the fiber, which are after being dried and pulverized in the shape of their alkaline salts grayish powders soluble in water; possessing affinity for the fiber, and which can be diazotized on the fiber and combined with azo dyestuff components, valuable fast shades being thus obtained, substantially as described.

3. The new dyestuffs being chemically amino-benzoylamino-benzoyl compounds of diamino sulfonic acids which are after being dried and pulverized in the shape of their alkaline salts grayish powders soluble in water; possessing affinity for the fiber, and which can be diazotized on the fiber and combined with azo dyestuff components, valuable fast shades being thus obtained, substantially as described.

4. The new dyestuffs being chemically aminobenzoylaminobenzoyl compounds of diamino disulfonic acids which are after being dried and pulverized in the shape of their alkaline salts grayish powders soluble in water; possessing affinity for the fiber, and which can be diazotized on the fiber and combined with azo dyestuff components, valuable fast shades being thus obtained, substantially as described.

5. The new dyestuff being chemically an aminobenzoyl-amino-benzoyl compound of diaminostilbene-disulfonic acid, which is after being dried and pulverized in the shape of its alkaline salt a grayish powder soluble in water; possessing affinity for the fiber, and which can be diazotized on the fiber and combined with azo dyestuff components, valuable fast shades being thus obtained, substantially as described.

In testimony whereof I have hereunto set my hand in the presence of two subscribing witnesses.

GEORG HOLSTE. [L. S.]

Witnesses:
  HELEN NUFER,
  ALBERT NUFER.